Figures 1, 2:
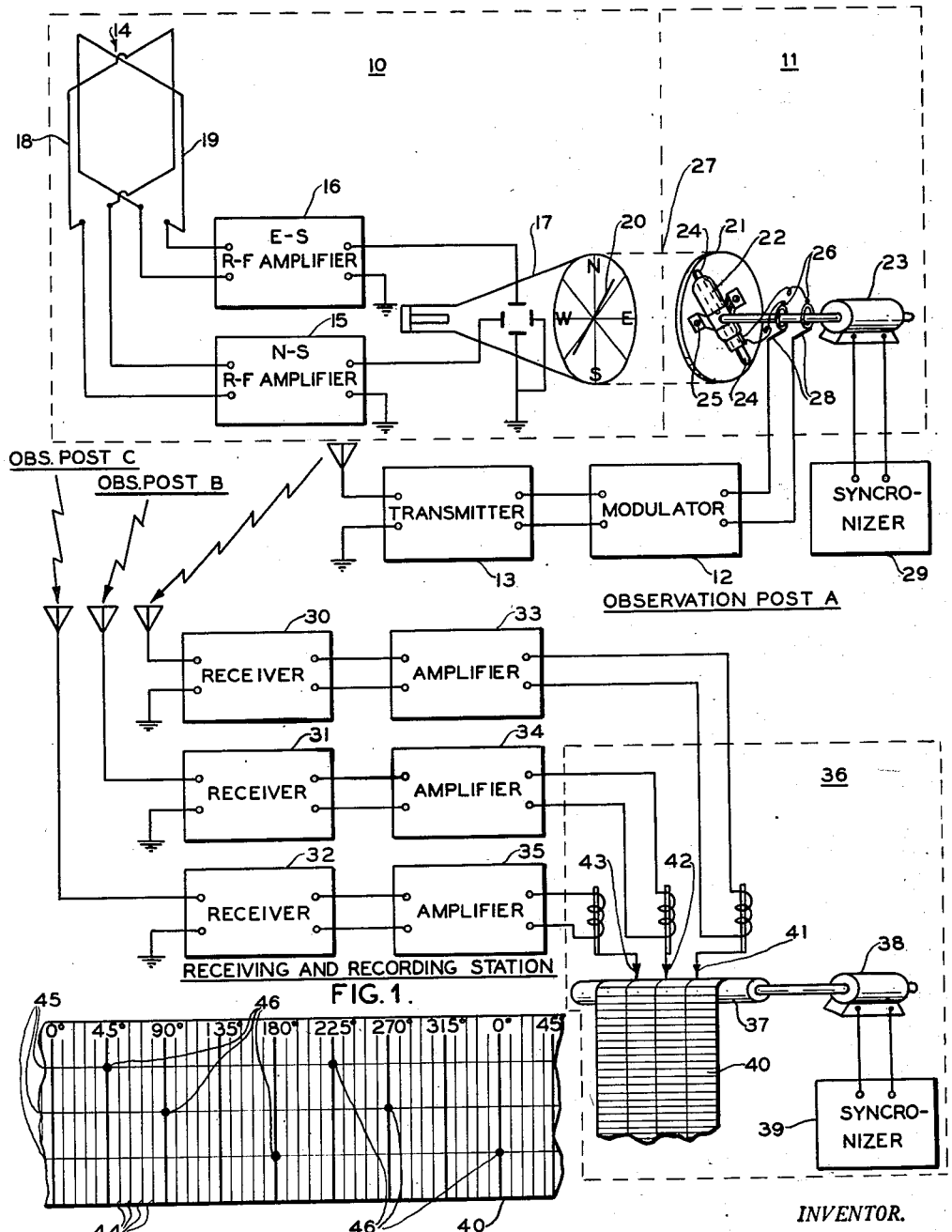

INVENTOR.
SAM SKURNICK

Patented June 25, 1946

2,402,688

UNITED STATES PATENT OFFICE 2,402,688

METEOROLOGICAL TELEMETERING SYSTEM

Sam Skurnick, Brooklyn, N. Y., assignor to Government of the United States of America, as represented by the Secretary of War Application May 16, 1945, Serial No. 594,143

5 Claims. (Cl. 177—351)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains generally to meteorological telemetering systems and more particularly to a radio system for taking bearing on atmospheric electrical disturbances at a plurality of spaced observation posts and transmitting such directional data to a central receiving and recording station whereby the sources of said disturbances may each be fixed by triangulation.

It is well known that certain meteorological situations, such as convective storms, are attended by severe electrical disturbances. The importance of this phenomenon becomes evident when it is remembered that standard hourly meteorological observations include the presence or absence of thunderstorms. It is also known that electrical discharges can occur in the upper atmosphere remote from the ground and that the existence and source of these discharges may be ascertained at points remote therefrom by means of the electromagnetic energy radiated from such a discharge.

This radiant energy arises from a sudden electrical impulse which represents an abrupt flow of current due to an electrical discharge of the type often seen during lightning storms. Knowledge of the geographical locations of areas of intense electrical activity is of considerable value to the meteorologist, especially if the areas involved are those where few observations can be made by regular observers, areas such as oceans and sparsely populated land areas.

It is the common practice in locating sources of electrical disturbances to employ techniques similar to that applied in radio direction finding. One device conventionally used for this purpose is the "Instantaneous Direction Finder," wherein a cathode-ray tube oscilloscope displays an immediate indication of the azimuth of the electrical disturbance, said indication assuming the form on the tube screen of a straight line trace whose orientation corresponds to the bearing of the disturbance with respect to the observation post.

If two such direction finder observations are made, the area of the discharge may be fixed by triangulation methods. To attain greater accuracy, however, at least three simultaneous observations are made at posts widely separated by distances of several hundred miles. Direction finding apparatus of this type is adapted to detect atmospheric discharges which occur within ranges extending to several thousand miles from the observation post. Consequently the equipment which will indicate the direction of each of the individual discharges is continually exhibiting many diverse discharge bearings in rapid succession.

When several widely spaced stations take bearings on a discharge it is clear that synchronizing means must be employed to insure that all stations are reading on an identical flash.

Heretofore, with this purpose in view, the observation posts were linked to each other and to the central station by a radio communication network. In order to synchronize the flash readings, one of the observation post operators would, upon viewing a particular flash indication, immediately notify all the other operators in the network by means of a tone signal. Whereupon the operators would communicate their reading obtained at that same instant to the central station, either verbally or by coded signals, and the source of the flash would then be plotted from this information.

Certain obvious defects are inherent in the foregoing method for synchronizing and transmitting directional data. By reason of the human error factor and the time lag introduced in taking readings in response to a synchronizing tone signal, and transmitting the positional data to a central station, inaccuracies arise which impair the usefulness of the system for meteorological purposes.

It is, therefore, the primary object of the present invention to obviate the above difficulty by providing a meteorological telemetering system for automatically and simultaneously transmitting bearing indications from a plurality of observation posts to a central station and for concurrently receiving and recording said bearing indications in a manner whereby the positions of the electrical disturbances may be quickly plotted.

It is another object of this invention to provide a telemetering system of the above type which is accurate and reliable in operation, and of simple, inexpensive construction.

For a better understanding of this invention, as well as other objects and features thereof, reference is had to the following detailed description to be read in connection with the accompanying drawing wherein, Figure 1 schematically illustrates, in a preferred embodiment, a complete meteorological telemetering system in accordance with the invention, and Figure 2 is a fragmentary view of the tape employed in the recording device shown in Figure 1.

Referring now to the drawing and more particularly to Figure 1 a telemetering system is disclosed including three observation posts A, B, and C, and a central receiving and recording station. Since observation posts A, B, and C are all identical, both in construction and operation, only post A is described in detail herein.

The apparatus installed at observation post A includes an instantaneous direction finder 10, furnishing bearing indications on atmospheric discharges, a scanning device 11, arranged to provide periodic electrical pulses whose time position is a function of the bearing as determined by direction finder 10, and a modulator 12 for imposing a low frequency modulation upon the carrier generated by a transmitter 13 in accordance with the pulses produced by scanning device 11.

The instantaneous direction finder 10 is comprised of a crossed-loop antenna 14, a pair of radio-frequency amplifiers 15 and 16, and a cathode-ray oscilloscope 17. Crossed-loop antenna 14 consists of two loops 18 and 19, intersecting at 90° with respect to each other.

As is well known in the art of direction finding, the output voltage of a loop antenna is directly proportional to the strength of the incoming signal (in this instance a static crash arriving from an atmospheric disturbance) and to the cosine of the angle between the direction of approach and the plane of the loop. Thus, the signal arriving at the loop in a direction contained in the plane of the loop will produce a maximum response, while one normal to the plane of the loop produces substantially null response.

Loop 18 is mounted so that it has its plane vertical in the North-South direction, and loop 19 is mounted so that it has its plane vertical in the East-West direction. Consequently, for signals arriving along the ground the output voltage of North-South loop 18 will be proportional to the cosine of the azimuth angle, while the output of East-West loop 19 will be proportional to the sine of the same angle. The two loops 18 and 19 being identical in construction, their output voltages will be identical in wave shape and in phase. The relative magnitude of the output voltages will be equal for signals arriving from angles of 45°, 135°, 225°, and 315°, whereas for all other angular positions the magnitude ratio will vary as a function of the arrival angle of the incoming signal.

Loops 18 and 19 are connected to separate radio-frequency amplifiers 15 and 16, of any suitable design, having identical phase shift and amplification characteristics. The outputs of amplifiers 15 and 16 are applied to the horizontal and vertical deflection plates respectively of cathode-ray tube 17. With such an arrangement the effect of the voltage introduced in crossed-loops 18 and 19 by an incoming static crash is to produce a luminescent line trace on the cathode-ray tube screen, such as is shown by trace 20, the angular position of which is controlled by the relative magnitudes of the loop output, and therefore corresponds to the bearing of the static crash. The length of the trace 20 depends upon the signal strength; hence it is of no significance. While there exists a 180° ambiguity in the bearing shown on cathode-ray tube 17, it is not necessary in the present system to eliminate the ambiguity by a sense antenna or other means since, in plotting, this ambiguity is resolved.

It is to be understood that the direction finder disclosed herein is not per se a part of this invention. For further information and a more detailed discussion of direction finder 10 reference may be had to the Journal of I. E. E., volume 64, page 611, 1926, "An instantaneous direction reading radio goniometer," R. A. Watson-Watt.

Scanning device 11 consists mainly of a disc 21, bearing a sensitive photoelectric cell 22, and rotated by a motor 23 having a uniform speed. Formed in disc 21 are a pair of oppositely disposed radial slots 24. The photo cell 22 is mounted with its longitudinal axis aligned with slots 24. The shaft of motor 23 is coupled to disc 21 by means of a centrally disposed bracket 25, and concentrically mounted on the shaft are a pair of slip rings 26 which are connected to the output terminals of photo cell 22.

In operation, disc 21 is superposed over the face of cathode-ray tube 17, and suitable masking means, indicated by dashed line 27, are provided to shield the tube screen and disc 21 from extraneous light. It will be seen that, as disc 21 rotates, an electrical impulse will be generated in photo cell 22 each time slots 24 are coincident with traces 20 appearing on the screen of tube 17, which event happens twice each scan cycle, and that, as disc 21 continues to revolve, a series of equi-spaced impulses will be generated.

The output of photo cell 22 is applied to modulator 12 by means of brushes 28 engaging slip rings 26. Modulator 12 is adapted to impress a low frequency modulation signal on the carrier generated by transmitter 13 at the instant and for the duration of each pulse produced by photo cell 22. The operation of motor 23 is governed by a synchronizer 29 whose function will be hereinafter explained.

At the receiving and recording station three conventional radio receivers 30, 31, and 32 are installed, receiver 30 being tuned to intercept signals emitted by transmitter 13 at observation post A, receiver 31 being similarly tuned to observation post B, and receiver 32 to observation post C. Receivers 30, 31, and 32 each demodulate the incoming carrier and yield a direct current pulse at the instant the modulation pulse, representing coincidence between scanning disc 21 and trace 20, appears. These direct current pulses are increased in magnitude by suitable amplifiers 33, 34, and 35 whose outputs are associated with a recording device 36.

Recording device 36 comprises a drum 37 rotated by a motor 38 whose operation is controlled by a synchronizer 39. A moving tape record 40 is caused to travel at a uniform speed, by means of drum 37 and is inscribed at certain intervals by three magnetically actuated styles 41, 42, and 43, arranged at fixed spaced positions across the tape. Stylus 41 is actuated by amplifier 33, stylus 42 by amplifier 34 and stylus 43 by amplifier 35. Each stylus is energized and depressed on tape 40 at a time determined by its associated observation post scanning disc.

As shown in Figure 2 the tape 40 is divided by evenly spaced indicia 44 calibrated in terms of azimuth degrees. The markings on the tape made by styles 41, 42, and 43 appear along lines 45.

Each stylus prints two dots 180° apart for each bearing indication as shown by dots 46. The position of tape 40 with respect to styles 41, 42, and 43 is initially adjusted so that when slots 24 on disc 21 are at zero degrees, the styles are correspondingly positioned with respect to the zero degree line on the tape.

The operation of recording motor 38 is synchronized with disc motor 23 by means of synchronizers 29 and 39 respectively, so that, when disc 21 makes a complete revolution, tape 40 is displaced 360°. Synchronizers 29 and 39 may be of the start-stop type such as is commonly used in facsimile systems or any other type as for example, the Hammond system, adapted for this purpose. It is of course important for the proper operation of the recording device 36 to have all the scanning motors at the observation posts carefully synchronized with recording motor 38.

The persistence of the screen of cathode-ray tube 17 is preferably such that the trace remains visible at least for the duration of half of a scan cycle. Amplifiers 15 and 16 and crossed-loop antenna 14 are preferably designed to operate at a relatively low radio frequency, in the order of 10 kilocycles, to escape interference from communication signals in the higher frequency bands resulting in spurious indications. Transmitter 13, however, may be operated in any available channel.

It is to be noted that while the telemetering system as described herein incorporates three observation posts A, B, and C, the invention is not limited to this specific number but may employ any desired plurality. Although the scanning device 11 has been shown in a preferred embodiment entailing a scanning disc 21, other suitable scanning methods may be employed, as for example, a revolving light beam in conjunction with a photoelectric cell which responds when the beam is incident to a luminescent trace on the screen of the cathode-ray tube indicator. The recording device 36 may, if preferred, be arranged so that the styles 41—43 travel over a fixed record, in lieu of the contrary method shown herein.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

What is claimed is:

1. In a meteorological telemetering system, the combination comprising a plurality of spaced observation posts, each including means for displaying a line indication whose angular position corresponds to the bearing of an electrical flash, radio means for transmitting an electrical pulse whose time position is controlled by the angular position of said line indication, a like plurality of radio receivers at a central station remotely disposed from said observation posts, each of said receivers being tuned to a distinct observation post to detect electrical pulses therefrom, and means associated with said receivers for separately and concurrently recording the electrical pulses yielded in the respective outputs thereof whereby each of the line indications may be determined by the relative time positions of the recorded pulses.

2. In a meteorological telemetering system, the combination comprising a plurality of spaced observation posts, each including means for displaying a line indication whose angular position corresponds to the bearing of an electrical flash, means for continuously scanning said line indication at a uniform rate to produce an electrical pulse each time said scanning means coincides with said line indication, means responsive to said electrical pulse to modulate a radio carrier, a like plurality of receivers at a central station remotely disposed from said observation posts, each of said receivers being tuned to a distinct observation post carrier to detect electrical pulses therefrom, and means associated with said receivers for separately and concurrently recording the electrical pulses yielded in the respective outputs thereof whereby each of said line indications may be determined by the relative time positions of the recorded pulses.

3. In a meteorological telemetering system, the combination comprising a plurality of spaced observation posts, each including means for displaying a line indication whose angular position corresponds to the bearing of an electrical flash, means for continuously scanning said line indication at a uniform rate to produce an electrical pulse each time said scanning means coincides with said line indication, means responsive to said electrical pulse to modulate a radio carrier, a like plurality of receivers at a central station remotely disposed from said observation posts, each of said receivers being tuned to a distinct observation post carrier to detect electrical pulses therefrom, means associated with said receivers for separately and concurrently recording the electrical pulses yielded in the respective outputs thereof, and means for synchronizing the operation of said scanning means with said recording means whereby each of said line indications may be determined by the relative time positions of the recorded pulses.

4. In a meteorological observation post, the combination comprising a cathode-ray oscilloscope, means for producing a line indication on the screen of said oscilloscope whose angular position corresponds to the bearing of an electrical flash, a scanning disc superposed over the screen of said oscilloscope, said scanning disc having formed therein two oppositely disposed radial slots, a photoelectric cell so mounted on said disc as to receive light through said slots, means for rotating said disc at a uniform speed whereby an electrical pulse is generated by said photoelectric cell each time said slots coincide with said line indication, and means for transmitting said electrical pulse.

5. In a meteorological observation post, the combination comprising a cathode-ray oscilloscope, a pair of crossed-loops mounted perpendicularly with respect to each other, one being oriented in the north-south direction, the other in the east-west direction, means for applying the output of said north-south loop to the vertical deflection means of said oscilloscope, means for applying the output of said east-west loop to the horizontal deflection means of said oscilloscope whereby a line indication is obtained on the screen thereof whose angular position corresponds to the bearing of an electrical flash intercepted by said loops, a scanning disc superposed over said screen, said scanning disc having formed therein two oppositely disposed radial slots, a photoelectric cell so mounted on said disc as to receive light through said slots, means for rotating said disc at a uniform speed whereby an electrical pulse is generated by said photoelectric cell each time said slots coincide with said line indication, a radio transmitter, and means responsive to said electrical pulse for impressing a modulation upon said transmitter.

SAM SKURNICK.